United States Patent [19]

Lufkin et al.

[11] 3,999,310
[45] Dec. 28, 1976

[54] ARITHMETIC DEVICE

[76] Inventors: James Alan Lufkin, 131 Nova Drive; Paul E. Peterson, 1405 Grand Ave., both of Piedmont, Calif. 94611

[22] Filed: Dec. 3, 1975

[21] Appl. No.: 637,381

[52] U.S. Cl. ................................ 35/31 C; 35/70
[51] Int. Cl.² ........................................ G09B 19/02
[58] Field of Search ............ 35/31 C, 31 G, 69, 70, 35/71, 41, 42; 273/155

[56] References Cited

UNITED STATES PATENTS

| | | | |
|---|---|---|---|
| 3,487,578 | 1/1970 | Sudermann | 273/155 X |
| 3,550,310 | 12/1970 | Bock-Greissau | 273/155 X |
| 3,628,261 | 12/1971 | Thompson | 35/70 |
| 3,836,418 | 9/1974 | Montgomery | 273/155 X |

FOREIGN PATENTS OR APPLICATIONS 745,872  2/1933  France .................................. 35/41

*Primary Examiner*—Harland S. Skogquist
*Attorney, Agent, or Firm*—Robert R. Tipton

[57] ABSTRACT

A plurality of rectangular blocks are juxtaposed in a rectangular coordinate ordered array to define a generally planar exposed surface with the opposite surface of the blocks attached to a flexible backing which functions as a hinge to allow a linear array of blocks to be pivoted parallel to a rectangular coordinate and expose indicia on the juxtaposed surfaces of the linear array, the indicia being related to other indicia on the exposed surface of the array such as the product of multiplying the two numbers along coordinate edges of the array.

1 Claim, 6 Drawing Figures

ARITHMETIC DEVICE

BACKGROUND OF THE INVENTION

This invention relates generally to educational devices and in particular to devices for teaching preschool and elementary school children solutions to problems involving two known facts.

The educational devices of the prior art that were used to teach solutions to arithmetic problems all utilized a rectangular display of either loose blocks or cards and a playing board or rack onto which the blocks or cards were placed to designate solutions to arithmetic problems displayed along an outer edge of the playing board. For example, one device used a tray with numbers disposed along a vertical and horizontal edge and a plurality of numbered blocks which are placed at the horizontal and vertical coordinate intersections to correspond to the product of the respective numbers along the horizontal and vertical edges.

Some devices used rectangular blocks with various types of slotted edges to permit interlocking the blocks. Still others used not only rectangular six sided blocks but also blocks having eight or more sides with indicia on each side or flat surface.

One device used a plurality of disks disposed in a rectangular array and pivotally mounted in rows on parallel spaced apart rods.

All the prior art devices required the use of many loose and easily lost playing pieces or complicated mechanical arrangements that were costly to manufacture.

SUMMARY OF THE INVENTION

The educational apparatus of the present invention is an integrated structure and combination for teaching solutions to arithmetic or similar problems using a plurality of rectangular blocks or cubes juxtaposed in a rectangular ordered array one block thick with one surface of the blocks defining a generally planar exposed surface and with means for connecting the blocks together to permit separate horizontal and vertical linear arrays of blocks to be rotated with respect to each other to expose indicia along the juxtaposed surfaces of the blocks, which indicia represent answers to problems posed by other indicia along coordinate edges of the exposed planar surface.

The arithmetic education device of the present invention further contemplates the use of a single row of blocks or cubes without indicia to be connected to each other to permit sections of the row of cubes to be isolated and recombined.

It is, therefore, an object of the present invention to provide a device for teaching problem solution to preschool and elementary school age children.

It is another object of the present invention to provide a device for teaching arithmetic tables to preschool and elementary school age children.

It is a further object of the present invention to provide a device for teaching pre-school and young elementary school age children using a single unit device of simple construction and operation.

It is still a further object of the present invention to provide a device for teaching pre-school and young elementary school age children arithmetic tables in a rectangular coordinate system.

These and other objects of the present invention will be manifest upon study of the following detailed description when taken together with the drawings.

DESCRIPTION OF THE PREFERRED EMBODIMENT

Figure 1:
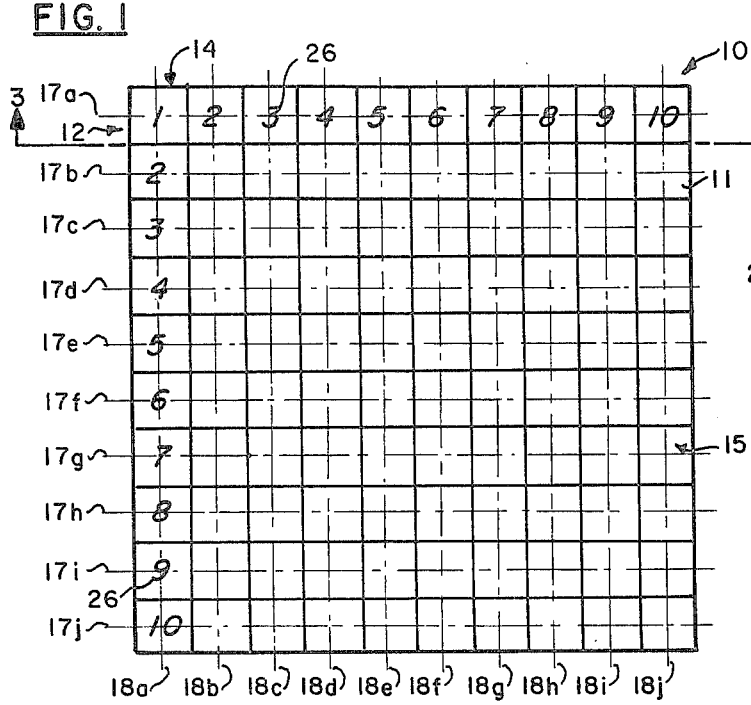
FIG. 1 is a plan view of the arithmetic education device of the present invention.

With reference to FIG. 1, the arithmetic education device 10 of the present invention comprises, basically, a plurality of rectangular blocks 11 juxtaposed in a rectangular ordered array of rows 12 and columns 14 and defining a generally planar surface 15. The centerline 17a–17j of each row and 18a–18j of each column thus defines a rectangular coordinate system of abscissas 17a–17j and ordinates 18a–18j.

Figure 2:
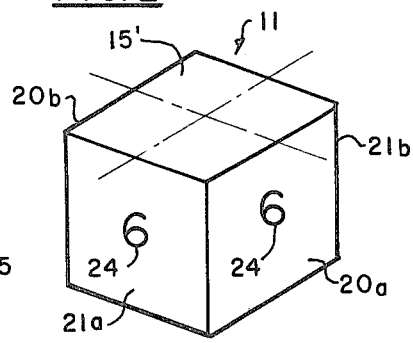
FIG. 2 is an isometric view of a typical rectangular block.

An individual block 11 is shown in isometric view in FIG. 2 and comprises a top exposed surface 15', which, when combined with the other blocks becomes a part of planar exposed surface 15; a pair of vertical juxtaposed sides or surfaces 20a and 20b; a pair of horizontal juxtaposed sides or surfaces 21a and 21b; and a base surface 22.

Indicia 24 is placed on the juxtaposed surfaces 20a and 21a which is mathematically related to indicia 26 placed on surface 15' of blocks 11 which are disposed along ordinate 18a and abscissa 17a (FIG. 1).

Figure 3:
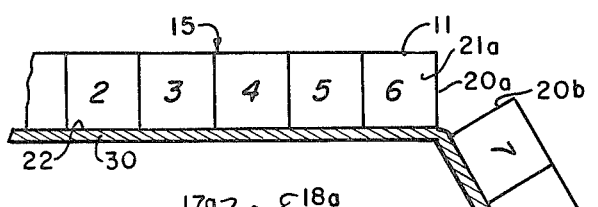
FIG. 3 is a section through the arithmetic education device of the present invention taken at lines 3—3 of FIG. 1.

With reference to FIG. 3, a section through arithmetic education device 10 taken at line 3—3 of FIG. 1, each juxtaposed block 11 is attached by a suitable adhesive common in the art, to flexible backing material 30 which can comprise a woven cloth material or rubber or flexible plastic sheeting material or a combination of woven and flexible plastic sheeting material common in the art.

As can be seen for two of the blocks, flexible backing material 30 acts as a hinge or pivot to permit juxtaposed surfaces 20a and 20b to become exposed to view to reveal indicia 24. In their normal position with block 11 juxtaposed each other, only planar surface 15 can be viewed.

It is, of course, not necessary for arithmetic education device 10 to be always placed on a flat surface to prevent exposure of juxtaposed surfaces 20a and 20b. As long as the person holding device 10 grasps the unit to maintain a slight tension in backing material 30, all juxtaposed surfaces 20a, 20b, 21a and 21b will be forced against each other and thus planar surface 15 will remain unbroken.

Figure 4:
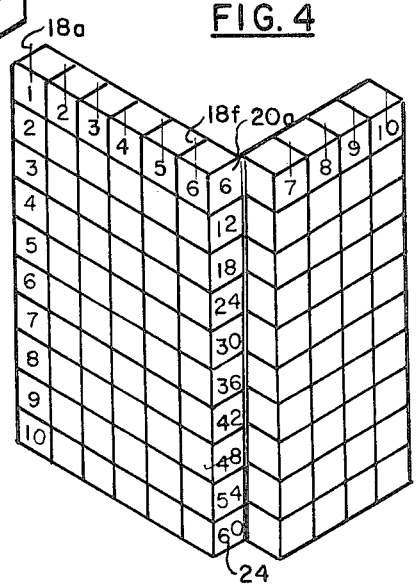
FIG. 4 is an isometric view of the arithmetic education device of the present invention showing the method of exposing to view a vertical array of normally hidden juxtaposed surfaces.

To operate the arithmetic education device 10 of the present invention, attention is called to FIG. 4. Device 10 is shown in isometric view with flexible backing material 30 bent along a line parallel to ordinate 18f to expose juxtaposed surface 20a of block 11 in the columns identified by ordinate or centerline 18f.

The indicia 24 on the juxtaposed surface 20a of block 11 in the row identified by centerline or abscissa 17a represents the product of the number 6 and 1, which is 6.

The indicia 24 on the juxtaposed surface 20a of block 11 in the row identified by centerline or abscissa 17b represents the product of the number 6 and 2, which is 12.

Similarly, the indicia 24 on the juxtaposed surfaces 20a of the remaining blocks 11 in column 18f represents the product of the numbers for the respective rows and the number 6.

Thus, the product of the number for each abscissa 17a–17j; and ordinate 18a–18j is found on the juxtaposed surface 20a of block 11 located at the intersection of the respective abscissas 17a–17j and ordinates 18a–18j.

Figure 5:
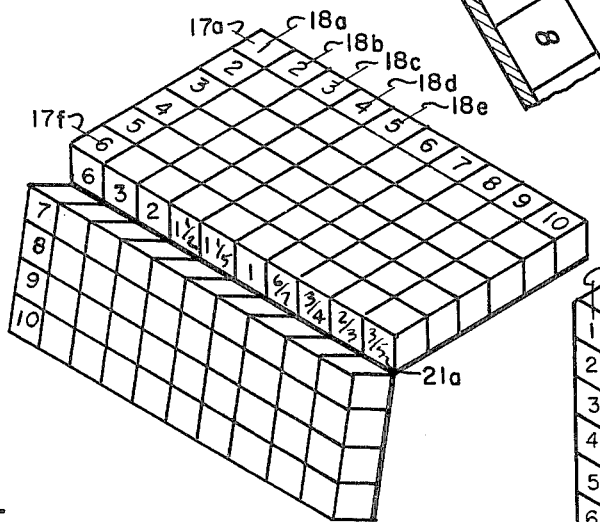
FIG. 5 is an isometric view of the arithmetic education device of the present invention showing the method of exposing to view a horizontal array of normally hidden juxtaposed surface.

With respect to FIG. 5, again device 10 is shown in isometric view, however, flexible backing 30 is now bent along a line parallel to abscissa 17f to expose juxtaposed surfaces 21a of blocks 11 in the column identified by abscissa or centerline 17f.

While the indicia 24 on juxtaposed surfaces 21a demonstrated multiplication tables in FIG. 4, the indicia 24 on juxtaposed surfaces 21a could be used to demonstrate division tables. For example, indicia 24 on surface 21a could represent the quotient of the numbers of surface 12 of row 17a divided by the numbers on surface 15 of column 18a. Thus, at the intersection of abscissa 17f for the number 6 and the ordinate 18c for the number 3, the quotient of 6 divided by 3 is ½.

In a similar manner, other arithmetic relations can be taught where the child can observe two relationships and learn the solution by exposing the answer to view.

The arithmetic education device 10 of the present invention is designed to meet several learning needs for both very young pre-school and older elementary school age children, i.e. the three to five year old pre-school and five to ten year old elementary school age children, respectively.

Figure 6:
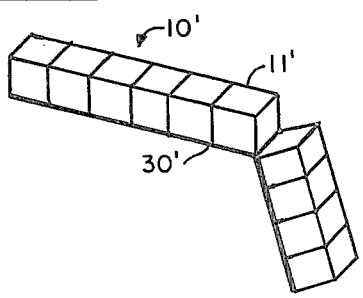
FIG. 6 is an isometric view of a single row device of the present invention.

As can be seen from the description, it provides for immediate self-checking feedback in that it lends itself to manipulation or object level (sensory-motor) learning, while at the same time permitting ready progression to sign (symbolic) level that marks more mature learning styles.

Where the arithmetic learning device 10' of the present invention comprises a single row, as shown in FIG. 6, two additional learning needs are also met, namely the development of conservation and reversibility whereby various combinations of cubes 11' can be discovered which give a total equal to the number of cubes in the row, such as 10 shown in the Figure. The original total of the number of cubes in the row can be reconstructed by laying the attached series in a straight line.

The arithmetic education device 10' of FIG. 6 is constructed similarly to device 10 of FIG. 1–5 and comprises a plurality of blocks 11' arranged in a linear juxtaposed array and attached on one surface to a flexible backing material 30' by a suitble adhesive common in the art. Material 30' can comprise a material identical to that described for backing material 30.

The child can flex the backing material as shown in FIG. 6 between the 6th and 7th cube from the left. Counting 6 cubes 11' to the left of the break and 4 cubes 11' to the right of the break, added together they total 10 cubes 11'. By laying the rows flat, the child can see that 6 combined with 4 equals 10.

We claim:
1. An educational device comprising
a plurality of square blocks adapted to be held in the hand and juxtaposed in a rectangular array of rows and columns defining a generally planar exposed surface, said blocks having a base surface lying in a common plane,
a sheet of flexible material attached to said base surface of said blocks and defining a plurality of pivots having two axes of rotation, each axis being perpendicular to each other in the plane of said base surface and parallel to a respective row and column,
means defining first indicia located on said exposed surface of said block, and
means defining second indicia having a mathematical relationship to said first indicia located in the juxtaposed adjacent surfaces of said blocks, said second indicia being viewable only when juxtaposed surfaces rotate about a pivotal axis along one of said two axes of rotation.

* * * * *